United States Patent [19]

Bonel

[11] 4,293,149
[45] Oct. 6, 1981

[54] RAPID COUPLING FOR PLASTIC PIPES

[75] Inventor: Federico A. Bonel, Barcelona, Spain

[73] Assignee: Industrias Neoplast, S.A., Barcelona, Spain

[21] Appl. No.: 79,593

[22] Filed: Sep. 27, 1979

[30] Foreign Application Priority Data

Oct. 2, 1978 [ES] Spain .................................. 238468

[51] Int. Cl.³ ............................................ F16L 17/02
[52] U.S. Cl. ................................. 285/111; 285/319; 285/322; 285/331
[58] Field of Search ............... 285/104, 105, 322, 319, 285/331, 258, 260, 382.4, 343, DIG. 22, 111

[56] References Cited

U.S. PATENT DOCUMENTS

| | | | |
|---|---|---|---|
| 2,103,838 | 12/1937 | Bach | 285/259 X |
| 2,727,759 | 12/1955 | Elliott | 285/322 X |
| 3,128,476 | 4/1964 | Lash | 285/260 X |
| 3,211,476 | 10/1965 | Wagner | 285/258 |
| 3,219,364 | 11/1965 | Wooldridge | 285/111 X |
| 3,490,793 | 1/1970 | Wagner | 285/258 |
| 3,565,467 | 2/1971 | Haldopoulos et al. | 285/319 X |
| 4,005,883 | 2/1977 | Guest | 285/322 |
| 4,026,581 | 5/1977 | Pasbrig | 285/331 X |

Primary Examiner—Thomas F. Callaghan

[57] ABSTRACT

The present invention relates to improved rapid coupling for plastic pipes, capable of being assembled by hand, comprising two cylindrical tubular pieces which are connected axially together by interlocking, with the interposition of a double-lipped gasket, the female piece being the receiver of the end of the pipe, the penetration of which causes the expansion of the female piece on the male piece, thus producing a watertight seal which is the greater, the higher the service pressure.

5 Claims, 4 Drawing Figures

RAPID COUPLING FOR PLASTIC PIPES

The object of the present invention is to provide a means of rapid axial connection between the ends of pipes, preferably plastic, by means of a pressure plug/-socket coupling, representing a marked improvement on the systems and devices known up to now, in which threaded elements or conical pieces subjected to an axial pressure are generally used.

The said coupling is particularly suitable for incorporation in lengths of hose pipe and other installations likely to change direction.

This method of joining, for which a patent is applied—for, is characterised especially by the facility of fitting and its high degree of safety in application, in spite of—the simplicity of the device.

The novelty of this article rests on the fact that the device which holds the pipe is formed only by the combination of two essentially cylindrical pieces which contain and hold the pipe and a double-lipped flexible gasket, the purpose of which is simply to guarantee a good seal in the coupling.

These two pieces which unlike other known devices do not have any thread, are fitted by plugging one into the other by simple hand pressure, the assembly thus formed being used as a coupling because all it needs is to plug the pipe into the accessory for this to operate as soon as there is service pressure.

Inside one of the pieces, designed to receive the pipe axially when connected, there is an annular space for housing the sealing gasket which, instead of being toric as in other systems, is in this case double-lipped so that fitting the pipe is easy and there is no need for bevelling its end.

Fitting and disconnecting the present device is done manually, forming a perfectly watertight coupling, capable of withstanding pressures greater than 10 kg/cm$^2$ without the said pressure forcing the connector apart.

For more precise interpretation of the article to which this document relates, the drawing attached to this specification shows a practical form for the industrial realisation and only by way of example, hence not exhaustive but merely informative.

Figure 1:
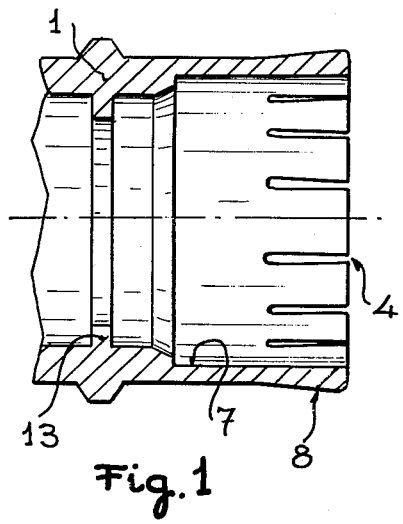
FIG. 1 shows a sectional detail of the male piece of the coupling.

The following references apply to the said figures:
1.—Male piece
2.—Female piece
3.—Double-lip gasket
4.—Coaxial tongues of the male piece
5.—Coaxial tongues of the female piece
6.—Jaws
7.—Internal step
8.—External divergent taper
9.—Pipe
10.—Annular seating
11.—Internal wall
12.—External fins
13.—Internal projection As will be seen from a careful inspection of the said drawing, the article which is favoured is formed fundamentally of two pieces, male 1 and female 2 which receives pipe 9, there being interposed between the two a double-lip gasket, the whole fitted together by hand pressure, thus obtaining a perfect seal in service in the assembly.

Figure 3:
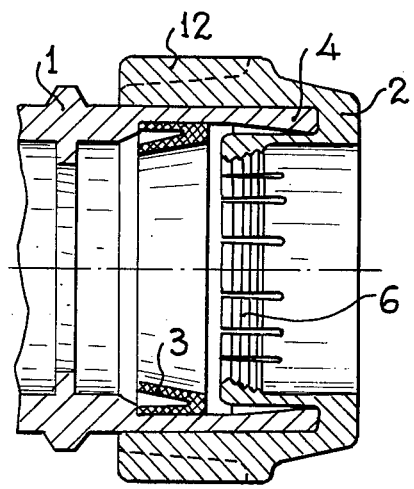
FIG. 3 shows the male and female pieces assembled.

The said two pieces, male 1 and female 2, are essentially cylindrical and join together axially, as shown on FIG. 3.

The male piece, FIG. 1, has in its mouth a series of—tongues 4, obtained at the end of the coupling by means of a series of channels cut coaxially and diametrically, there being on the outside a divergent tapering thickening 8, oriented outwards, whilst on the inside there is a step 7 for receiving the double-lip sealing gasket 3, the dihedral edge of which is also oriented towards the mouth so as to receive pipe 9. This penetrates perfectly as seen on FIG. 4.

Inside the male piece 1 there is an annular projection 13 which serves as a stop for the housing of pipe 9.

Figure 2:
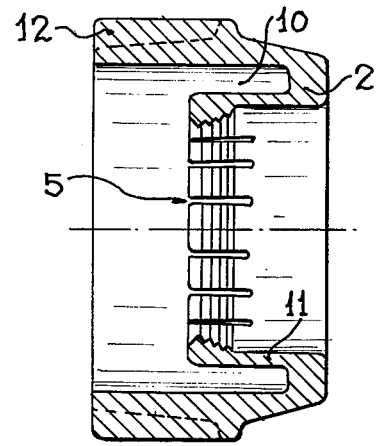
FIG. 2 shows the female piece of the coupling, diametrically sectioned.

The female piece, FIG. 2, for its part, has an internal annular seating 10, created by a cylindrical wall, also internal, 11 and the external wall of the said piece 2, provided for this purpose with several fins 12 which strengthen it to prevent deformation. In the said internal wall 11,—several tongues 5 have been made by coaxial channels, the tongues 5 of which have an internal tapered thickening to form divergent jaws 6 oriented towards the mouth.

Under such conditions, tongues 4 and 5 provide a relative flexibility to the tubular ends, so that when the two pieces 1 and 2 are plugged together, FIG. 3, the tongues 4 of the male piece 1 are introduced into the annular seating 10 of the female piece 2, so that when the said tongues 4 enter, they are pressed by the surrounding wall of the female piece 2 and prevented from deforming by the fins 12, the said—tongues 4 being deformed so that the taper 8 is created in the interior.

Of course, before pieces 1 and 2 are connected together, the double-lip sealing gasket 3 has been placed at the bottom of step 7, as shown on FIG. 3.

Figure 4:
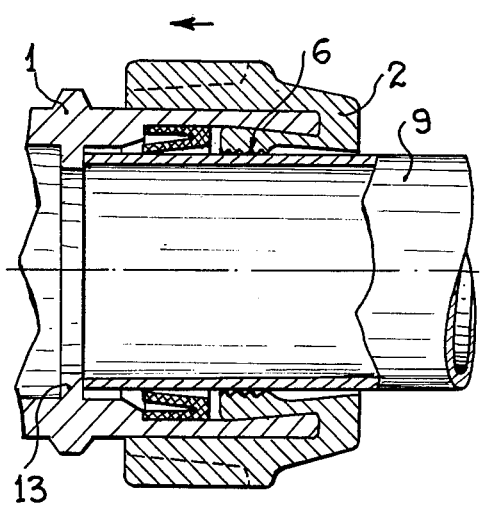
FIG. 4 shows the same coupling with the pipe inserted, as yet without any water pressure acting on it.

Once the two pieces 1 and 2 are asembled, the end of pipe 9 is introduced until it seats against stop 13, FIG. 4, pressing on jaws 6, so that tongues 5 of which they form part deform as a result of the flexibility created by the notches in the said tongues 5, these being opened in relation to the degree of taper of the said jaws 6, so that an effective—pressure is established against tongues 4 of the male piece 1 contained in seating 10, causing the coupling between the two pieces 1 and 2 to be virtually unremovable so long as pipe 9 is not removed, the watertightness of the assembly being guaranteed and supplemented by the double-lip gasket 3.

It must be emphasized that the installation as per FIG. 4 is produced before pressure acts on pipe 9, so that when this occurs, a slight shifting of the pipe occurs axially, causing it to pull on female piece 2, producing a perfect fit and interlocking with the fins 4 of male piece 1.

By reason of the said effect, it is necessary, in order to dismantle the assembly, to draw back the female piece 2 in the direction shown by the arrow on FIG. 4, i.e. it must be returned to its initial position in order to free pipe 9 from the pressure which the interlocking exerts on it.

Consequently, for the pipe to be removed, there must be no pressure in it, since the greater the pressure, the greater the coupling pressure.

Having thus sufficiently described the nature of the invention, and having given a practical example of realisation thereof, it only needs to be added that changes of materials, shapes and arrangement of its elements can be introduced,—provided such alterations do not involve a substantial variation in the article claimed.

What is claimed is:

1. A coupling device for a pipe comprising:
   (a) a male piece of generally cylindrical cross-section, said male piece having an end portion, said end portion having slots therein defining tongues;
   (b) a female piece of generally cylindrical cross-section, said female piece having an opening for receiving said pipe and a longitudinally extending seat for receiving the end portion of said male piece, the end portion and the seat being arranged to cause the tongues of said end portion to be deflected radially inwardly when said end portion is received by said seat, said female piece further including a inner wall disposed substantially concentrically inwardly of said seat said inner wall having slots therein defining tongues and being arranged to deflect outwardly in response to said pipe penetrating said female piece, the tongued inner wall and said end portion interlocking to form a fluid-tight seal.

2. A coupling device according to claim 1, wherein the tongued inner wall of said female piece includes a notched and tapered radially inwardly directed surface for gripping said pipe and for deflecting said tongued inner wall radially outwardly in response to the penetration of said pipe.

3. A coupling device according to claim 1, further including a double-lipped gasket disposed in said male piece, the dihedral edge of said double-lipped gasket being oriented towards the opening for receiving the pipe and the tongued inner wall of the female piece.

4. A coupling device according to claim 1, wherein the end portion of said male piece includes a radially outwardly directed taper having a maximum diameter somewhat greater than the diameter of the seat of the female piece for causing the end portion to deflect radially inwardly when said male and female pieces are mated together.

5. A coupling device according to claims 1, 2, 3 or 4 wherein said male piece and said female piece are capable of being assembled by hand.

* * * * *